US007758410B2

(12) United States Patent
Hughes

(10) Patent No.: US 7,758,410 B2
(45) Date of Patent: Jul. 20, 2010

(54) GAMING TERMINAL WITH REPLAY BONUS FEATURE

(75) Inventor: Darryl W Hughes, Oak Park, IL (US)

(73) Assignee: WMS Gaming Inc., Waukegan, IL (US)

( * ) Notice: Subject to any disclaimer, the term of this patent is extended or adjusted under 35 U.S.C. 154(b) by 1303 days.

(21) Appl. No.: 10/938,101

(22) Filed: Sep. 10, 2004

(65) Prior Publication Data

US 2006/0068863 A1 Mar. 30, 2006

(51) Int. Cl.
*A63F 13/00* (2006.01)

(52) U.S. Cl. .......................................... 463/13; 463/16

(58) Field of Classification Search .................. 463/13; 273/274

See application file for complete search history.

(56) References Cited

U.S. PATENT DOCUMENTS 4,743,022 A 5/1988 Wood
5,294,120 A 3/1994 Schultz
5,308,065 A 5/1994 Bridgeman et al.
5,322,295 A 6/1994 Cabot et al.
5,401,023 A 3/1995 Wood
5,437,451 A 8/1995 Fulton
5,489,101 A 2/1996 Moody
5,511,781 A 4/1996 Wood et al.
5,531,448 A 7/1996 Moody
5,601,488 A * 2/1997 Kadlic ......................... 463/13
5,732,950 A 3/1998 Moody
5,816,916 A 10/1998 Moody
5,823,873 A 10/1998 Moody
5,868,619 A 2/1999 Wood et al.
5,882,259 A 3/1999 Holmes, Jr.
5,954,335 A 9/1999 Moody
5,957,774 A 9/1999 Holmes, Jr. et al.
5,976,016 A 11/1999 Moody et al.
6,007,066 A 12/1999 Moody (Continued)

FOREIGN PATENT DOCUMENTS

WO WO 97/27570 7/1997

OTHER PUBLICATIONS

Gambling Guide il dado, Tonk, Aug. 10, 2002, pp. 14-17 in STIC Search.*

*Primary Examiner*—Dmitry Suhol
*Assistant Examiner*—Malina K Rustemeyer
(74) *Attorney, Agent, or Firm*—Nixon Peabody LLP

(57) ABSTRACT

A method for conducting a wagering game includes receiving a wager from a player to play the game and providing a plurality of symbol-bearing objects to form a first user-playable hand. The method includes providing the ability to discard, via player selection, one or more of the provided symbol-bearing objects from the first user-playable hand. The discarded symbol-bearing objects are collected and replaced with a replacement symbol-bearing object to form a second user-playable hand. The method includes awarding the player a payoff based on a ranking of the second user-playable hand in response to the second user-playable hand meeting a predetermined criterion. The method includes forming a best-possible hand from the plurality of the symbol-bearing objects of the second user-playable hand and the collected, discarded symbol-bearing objects and awarding a bonus payoff based on a ranking of the best-possible hand in response to the best-possible hand meeting a predetermined criterion.

15 Claims, 7 Drawing Sheets

U.S. PATENT DOCUMENTS

| | | | |
|---|---|---|---|
| 6,012,720 | A | 1/2000 | Webb |
| 6,098,985 | A | 8/2000 | Moody |
| 6,110,040 | A | 8/2000 | Sanduski et al. |
| 6,120,378 | A | 9/2000 | Moody et al. |
| 6,132,311 | A | 10/2000 | Williams |
| 6,149,521 | A | 11/2000 | Sanduski |
| 6,206,780 | B1 | 3/2001 | Awada |
| 6,248,016 | B1 | 6/2001 | Walker et al. |
| 6,257,979 | B1 * | 7/2001 | Walker et al. ................. 463/13 |
| 6,336,860 | B1 | 1/2002 | Webb |
| 6,461,240 | B1 | 10/2002 | Perkins |
| 6,471,587 | B1 | 10/2002 | Wood et al. |
| 6,474,645 | B2 | 11/2002 | Tarantino |
| 6,494,454 | B2 | 12/2002 | Adams |
| 6,561,898 | B2 | 5/2003 | Moody |
| 6,569,013 | B1 | 5/2003 | Taylor |
| 6,569,014 | B2 | 5/2003 | Walker et al. |
| 6,581,936 | B1 * | 6/2003 | Zoccolillo et al. ........... 273/274 |
| 6,595,520 | B1 | 7/2003 | Richards et al. |
| 6,595,852 | B2 | 7/2003 | Wang |
| 6,612,927 | B1 | 9/2003 | Slomiany et al. |
| 6,616,142 | B2 | 9/2003 | Adams |
| 6,637,747 | B1 | 10/2003 | Garrod |
| 6,672,958 | B2 | 1/2004 | Bennett |
| 6,708,975 | B1 | 3/2004 | Fox et al. |
| 6,726,427 | B2 | 4/2004 | Jarvis et al. |
| 6,780,106 | B2 | 8/2004 | DeMar et al. |
| 6,857,957 | B2 | 2/2005 | Marks et al. |
| 2002/0034974 | A1 | 3/2002 | Wood et al. |
| 2002/0169015 | A1 | 11/2002 | Moody |
| 2002/0185816 | A1 | 12/2002 | Moody et al. |
| 2003/0032469 | A1 | 2/2003 | Moody et al. |
| 2003/0038425 | A1 | 2/2003 | Tarantino |
| 2003/0064773 | A1 | 4/2003 | Baerlocher et al. |
| 2003/0119572 | A1 | 6/2003 | Moody et al. |
| 2003/0153377 | A1 | 8/2003 | Lisowski, Sr. |
| 2003/0166411 | A1 | 9/2003 | Moody |
| 2003/0186733 | A1 | 10/2003 | Wolf et al. |
| 2003/0189290 | A1 | 10/2003 | Moody |
| 2003/0214097 | A1 | 11/2003 | Moody |
| 2004/0043807 | A1 | 3/2004 | Pennington |
| 2004/0132524 | A1 | 7/2004 | Ramstad et al. |
| 2004/0248641 | A1 | 12/2004 | Jarvis et al. |

* cited by examiner

GAMING TERMINAL WITH REPLAY BONUS FEATURE

FIELD OF THE INVENTION

The present invention relates generally to wagering games and, more particularly, to a poker game having a replay bonus feature.

BACKGROUND OF THE INVENTION

Gaming terminals, such as slot machines, video poker machines and the like, have been a cornerstone of the gaming industry for many years. Generally, the popularity of such machines with players is dependent on the likelihood (or perceived likelihood) of winning money at the gaming terminal and the intrinsic entertainment value of the machine relative to other available gaming options. Where the available gaming options include a number of competing machines and the expectation of winning on each machine is roughly the same (or believed to be the same), players are most likely to be attracted to the most entertaining and exciting machines. Shrewd operators constantly strive to employ the most entertaining and exciting machines available, because such machines attract frequent play and hence increase profitability to the operator.

In certain gaming machines, a player receives only a single hand from an electronic deck of cards to form the best-possible poker hand. Generally, the single hand is formed by dealing the player cards in at least two distinct rounds. If a player receives an initial deal of poor cards, the player feels that his chances of winning are greatly reduced because the possibility of improving his hand by discarding and receiving replacement cards is not good. To increase the opportunity to win, players often play multiple hands at the same time. Playing multiple hands increases the chance of at least one of the hands turning-up a winning combination. As a result, a player will perceive a better chance of winning and continue playing the machine. However, playing multiple hands may be confusing for some players and some players may simply prefer to play one hand at a time. Therefore, there is a need for new and improved single-hand video poker gaming machines that provide a player with the feeling that they have a better a chance of winning.

SUMMARY OF THE INVENTION

According to one embodiment of the present invention, a method for conducting a wagering game is disclosed. The method comprises receiving a wager from a player to play the game. The method further comprises providing a plurality of symbol-bearing objects to form a first user-playable hand. The method further comprises providing the ability to discard, via player selection, one or more of the provided symbol-bearing objects from the first user-playable hand. The method further comprises collecting the discarded symbol-bearing objects and replacing each of the discarded symbol-bearing objects with a replacement symbol-bearing object to form a second user-playable hand. The method further comprises awarding the player a payoff based on a ranking of the second user-playable hand in response to the second user-playable hand meeting a predetermined criterion. The method further comprises forming a best-possible hand from the plurality of the symbol-bearing objects of the second user-playable hand and the collected, discarded symbol-bearing objects. The method further comprises awarding a bonus payoff based on a ranking of the best-possible hand in response to the best-possible hand meeting a predetermined criterion.

According to one embodiment of the present invention, a method for conducting a wagering game is disclosed. The method comprises receiving a wager from a player to play the game. The method further comprises displaying a plurality of playing cards to form a first user-playable hand. The method further comprises providing the ability to discard, via player selection, one or more of the displayed playing cards from the first user-playable hand. The method further comprises collecting the discarded playing cards in a discard area. The method further comprises replacing each of the discarded playing cards with a replacement playing card to form a second user-playable hand. The method further comprises awarding the player a payoff based on a ranking of the second user-playable hand in response to the second user-playable hand meeting a predetermined criterion. The method further comprises forming a best-possible hand from the plurality of the playing cards of the second user-playable hand and the playing cards collected in the discard area. The method further comprises awarding a bonus payoff based on a ranking of the best-possible hand in response to the best-possible hand meeting a predetermined criterion.

According to one embodiment of the present invention, a gaming system capable of conducting a wagering game is disclosed. The system comprises a wager receptor, a display, an input device, a system memory, and a processor. The wager receptor receives a wager from a player to play the game. The display displays a plurality of symbol-bearing to form a first user-playable hand. The input device is adapted to allow the player to select one or more of the symbol-bearing objects from the first user-playable hand. The system memory is capable of storing a pay table thereon. The processor is coupled to the system memory, the input device, and the display. The processor is operative to (i) discard the selected one or more symbol-bearing objects, (ii) replace each of the one or more discarded symbol-bearing objects with a replacement symbol-bearing object to form a second user-playable hand, (iii) rank the second user-playable hand based on the pay table stored on the system memory, (iv) form a best-possible hand from the symbol-bearing objects from the second user-playable hand and the discarded symbol-bearing objects, and (v) rank the best-possible hand based on the pay table stored on the system memory.

According to one embodiment of the present invention, a method for conducting an electronic poker game is disclosed. The method comprises receiving a wager from a player to play the game. The method further comprises displaying, on a display, five playing cards to form a first user-playable hand. The method further comprises discarding, via player selection, one or more of the five displayed playing cards from the first user-playable hand. The method further comprises collecting the discarded playing cards in a discard area on the display. The method further comprises replacing each of the discarded playing cards with a replacement playing card to form a second user-playable hand of five cards. The method further comprises forming the best possible hand from the second user playable hand and the discarded playing cards. The method further comprises awarding a bonus payoff based on a ranking of the best-possible hand in response to the best-possible hand meeting a predetermined criterion.

The above summary of the present invention is not intended to represent each embodiment, or every aspect, of the present invention. Additional features and benefits of the present invention are apparent from the detailed description, figures, and claims set forth below.

Figure 1:
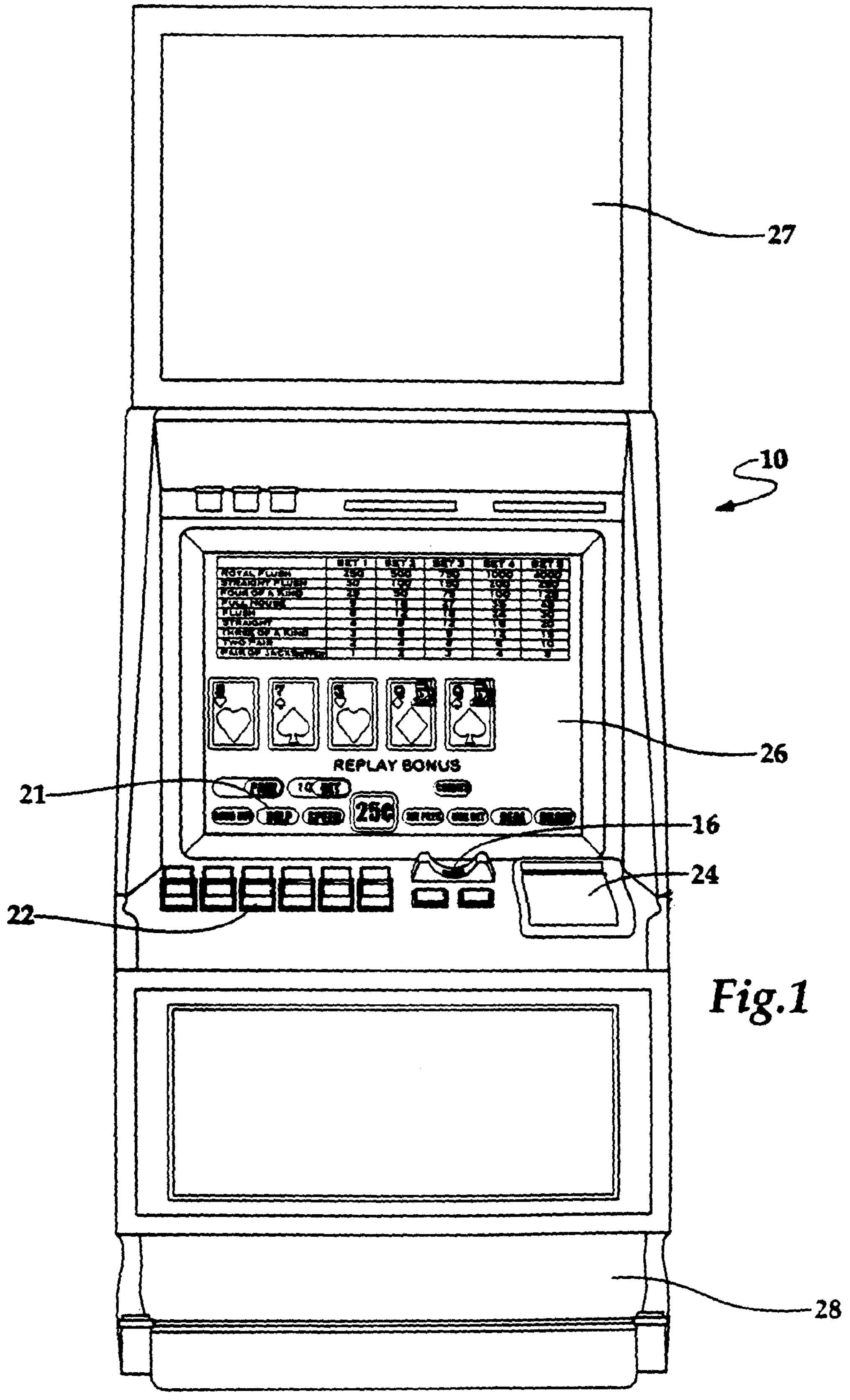
FIG. 1 is a perspective view of a gaming terminal according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Turning now to the drawings, FIG. 1 is a perspective view of a gaming terminal 10 according to one embodiment of the present invention. The gaming machine 10 is operable to conduct a wagering game. With regard to the present invention, the gaming terminal 10 may be any type of gaming terminal and may have varying structures and methods of operation.

The gaming terminal 10 includes input devices, such as a wager acceptor 16, a touch screen 21, a push-button panel 22, and a player-identification card reader 24. For outputs, the gaming terminal 10 includes a payout mechanism 23, a main display 26 for displaying information about a basic wagering game such as video poker and a secondary display 27 for displaying additional information, and an output receptacle 28 coupled to the payout mechanism 23 for providing tokens or coins to the player when the player selects to cash out. While these typical components found in the gaming terminal 10 are described below, it should be understood that numerous other elements may exist and may be used in any number of combinations to create various forms of a gaming terminal.

The wager acceptor 16 may be provided in many forms, individually or in combination. The wager acceptor 16 may include one or both of a coin slot acceptor or a currency note acceptor to input value to the gaming terminal 10. Additionally, the wager acceptor 16 may include a card-reading device for reading a card that has a recorded monetary value with which it is associated. The card may also authorize access to a central account, which can transfer money to the gaming terminal 10.

The payout mechanism 23 performs the reverse functions of the wager acceptor 16. For example, the payout mechanism 23 may include a coin dispenser or a note dispenser to output value from gaming terminal 10. Also, the payout mechanism 23 may be adapted to receive a card that authorizes the gaming terminal to transfer credits from the gaming terminal 10 to a central account.

The push button panel 22 is typically offered, in addition to the touch screen 21, to provide players with an option of how to make their game selections. Alternatively, the push button panel 22 provides inputs for one aspect of operating the game, while the touch screen 21 allows for inputs needed for another aspect of operating the game.

The operation of the basic wagering game is displayed to the player on the main display 26. The main display 26 and the secondary display 27 may take the form of a cathode ray tube (CRT), a high resolution LCD, a plasma display, LED, or any other type of video display suitable for use in the gaming terminal 10. As shown, the main display 26 includes a touch screen 21 overlaying the entire monitor (or a portion thereof) to allow players to make game-related selections. Similarly, a touch screen may overlay the secondary display 27.

The player-identification card reader 24 allows for the identification of a player by reading a card with information indicating the player's true identity. Currently, the identification is used by casinos for rewarding certain players with complimentary services or special offers. For example, a player may be enrolled in the gaming establishment's players' club and may be awarded certain complimentary services as that player collects points in the player's player-tracking account. The player inserts the player's card into the player-identification card reader 24, which allows the casino's computers to register that player's wagering at the gaming terminal 10.

Figure 2:
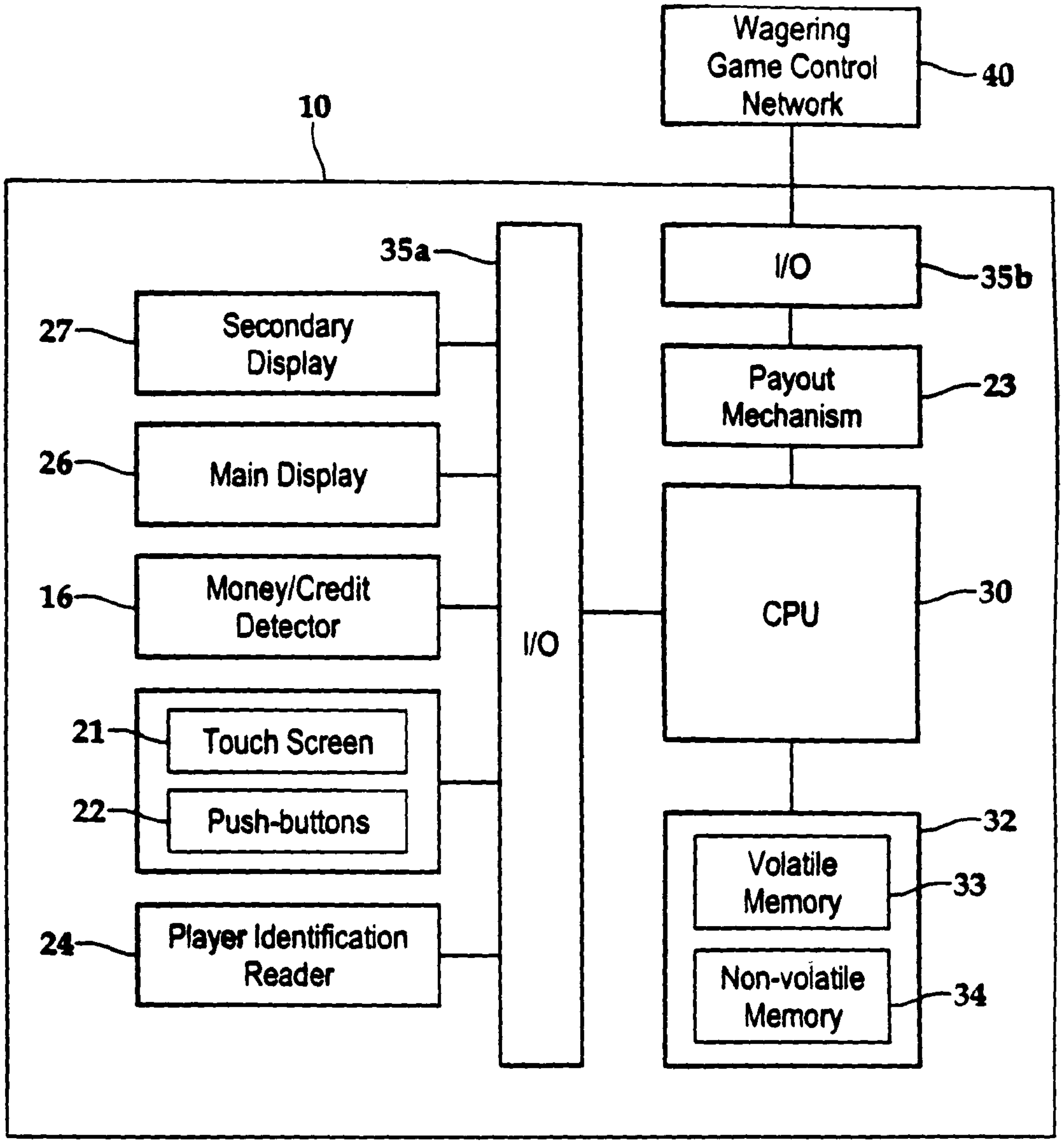
FIG. 2 illustrates a control system that is used in conjunction with the gaming terminal of FIG. 1.

Referring also to FIG. 2, the various components of the gaming terminal 10 are controlled by a central processing unit (CPU) 30 (such as a microprocessor or microcontroller). To provide the gaming functions, the CPU 30 executes a game program. The CPU 30 is also communicatively coupled to or includes a system memory 32. The system memory 32 may comprise a volatile memory 33 (e.g., a random-access memory, "RAM") and a non-volatile memory 34 (e.g., an EEPROM). It should be appreciated that the CPU 30 may include one or more microprocessors. Similarly, the memory 32 may include multiple RAM and multiple program memories.

Communications between the peripheral components of the gaming terminal 10 and the CPU 30 occur through input/output (I/O) circuits 35*a*. As such, the CPU 30 also controls and receives inputs from the peripheral components of the gaming terminal 10. Further, the CPU 30 communicates with external systems via the I/O circuits 35*b*. Although the I/O circuits 35 may be shown as a single block, it should be appreciated that the I/O circuits 35 may include a number of different types of I/O circuits.

The gaming terminal 10 is typically operated as part of a game control network 40 having control circuitry and memory devices, wherein a plurality of gaming terminals are coupled to the game control network 40. The game control network 40 can be the game controller that controls operation of the wagering game as described below. The processor, memory, or both may be remotely located on the game control network 40. For example, instead of the CPU 30, the game control network 40 may determine the random outcomes for games conducted on the gaming terminal(s) 10. Alternatively, the CPU 30 randomly determines the game outcomes.

The gaming terminal 10 often has multiple serial ports, each port dedicated to providing data to a specific host computer system that performs a specific function (e.g., accounting system, player-tracking system, etc.). To set up a typical serial communication hardware link to the host system, the typical RS-232 point-to-point communication protocol that is often present in the gaming terminal 10 is converted to an RS-485 (or RS-485-type) master-slave protocol so as to take advantage of some of the benefits of the RS-485 capability (e.g., multi-drop capability that allows many gaming terminals 10 to communicate with the game control network 40). To perform this function, a custom interface board may be used by the gaming terminal 10 for each communication port in the gaming terminal 10. It should be noted that the gaming terminal 10 can initially be designed to be configured for a typical RS-485 protocol, instead of the typical RS-232 protocol. Further, the gaming terminal 10 may simply be designed for an Ethernet connection to the game control network 40.

Figure 3:
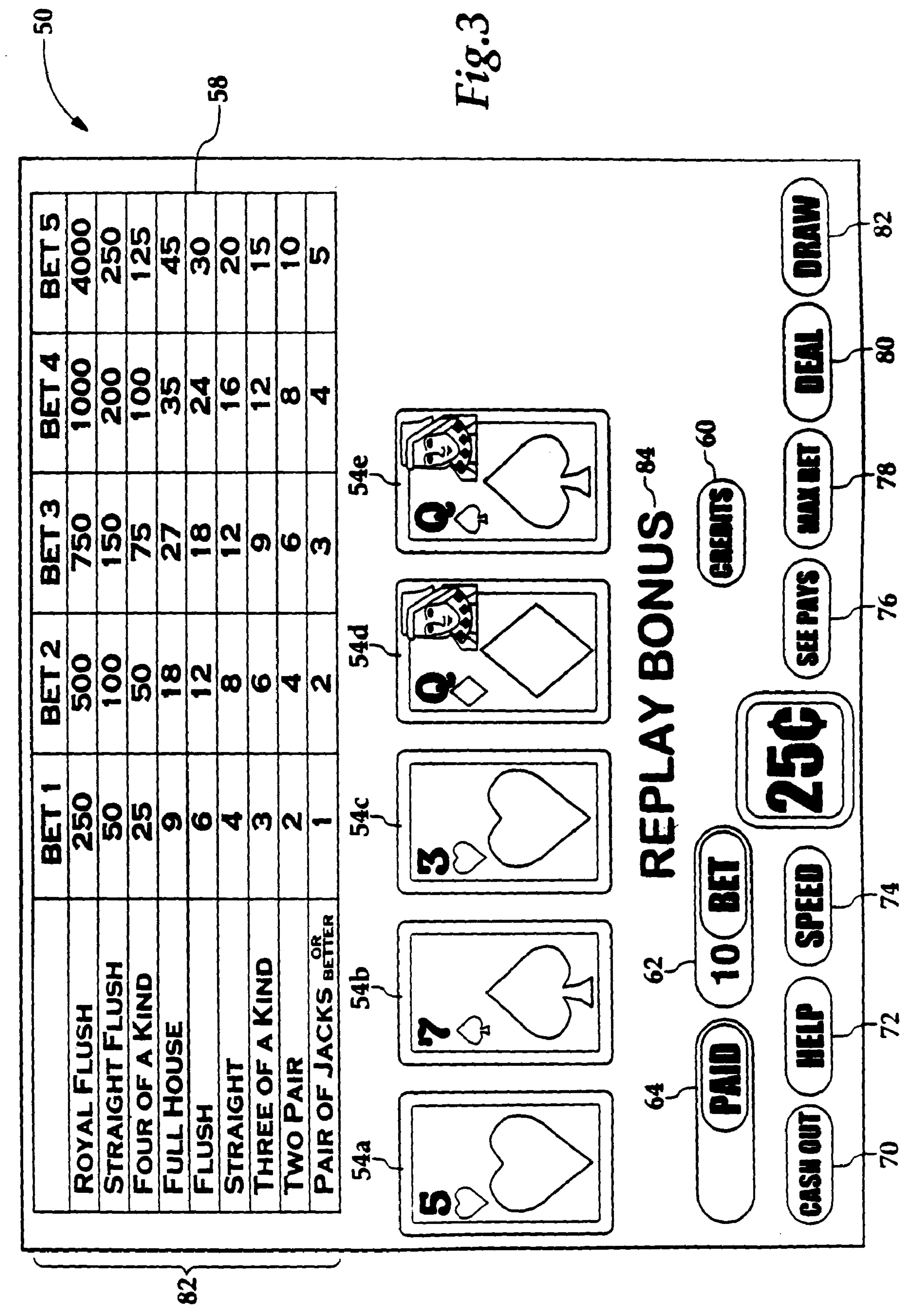
FIG. 3 is an image of a main poker game screen that is displayed on the gaming terminal of FIG. 1, according to one embodiment of the present invention.

Referring now to FIG. 3, an image of a video poker game screen 50 which can be displayed on the main video display 26 is illustrated, according to one embodiment of the present invention. A player begins play of the basic wagering game by inserting a wager input into the wager input accepter 16 of the gaming terminal 10. A player can select play by either using the touch screen 21 or push-button panel 22. The CPU 30, or the wagering game control network 40 in alternative embodiments, operates to execute a wagering game program causing the main video display 26 to display the wagering game that includes a plurality of visual elements.

According to one embodiment, a video poker game is preferably played with a single standard 52-card deck (i.e., Ace through King of four different suits). The standard 52-card deck may then be supplemented with one value symbol-bearing object (in the illustrated example, a value card). According to another embodiment, a card is selected from the single standard 52-card deck, and the selected card serves as the value object. However, a poker game may be played with any number of decks and/or with a variety of different card compositions (e.g., additional value objects, wild cards, etc.).

According to one embodiment, during a particular poker hand, all of the cards are dealt from the same deck. After a card is dealt from the deck into the poker hand, the card is "used up" and cannot appear again until the next poker hand. The deck may be replenished and randomly shuffled prior to every poker hand. The system memory 32 includes a data structure for storing data representing each card of the deck. The CPU 30 randomly selects cards for each poker hand from the data structure and controls the main video display 26 to display the cards.

An image of a video poker game screen can be seen in FIG. 3. The main poker game screen 50 featuring a five-card draw poker game in the illustrated embodiment may be displayed on the main video display 26. In the illustrated embodiment, the main poker game screen 50 is used to display a user-playable hand 54 composed of a plurality of cards 54*a-e*. The main poker game screen 50 also displays a pay table 58, game session meters, and various buttons selectable by a player.

The game session meters include: a "credits" meter 60 for displaying a number of credits available for play on the machine; a "bet" meter 62 for displaying a number of credits wagered (e.g., from 1 to 10 credits); and a "paid" meter 64 for displaying an amount to be awarded based on the results of the particular rounds outcome. The player-selectable buttons include a "cash out" button 70 to collect the credits remaining, in the credits meter 60; a "help" button 72 for viewing instructions on how to play the video poker game; a "speed" button 74 for allowing a player to adjust the speed that the cards are dealt, the hands are formed, the length of time the winning hand is displayed, the length of time the winnings are displayed, the overall speed of the game, etc.; a "see pays" button 76 for displaying a larger pay table to the player (or displaying the pay table in embodiments where the pay table is not constantly displayed); a "max bet" button 78 for wagering a maximum number of credits (e.g., 5 credits); a "deal" button 80 for causing the game to initially deal cards from a deck into the user-playable hand 54 face-up; and a "draw" button 82 for causing the game to replace any non-held card in the user-playable hand 54 with another card from the deck.

The pay table 58, shown on the main display 26, may also or alternatively be displayed on the secondary screen 27. The pay table 58 includes a list of winning poker hand rankings 82 and a plurality of payout columns with payouts associated with each ranking. The number of credits won is linearly proportional to the number of credits wagered, except that a royal flush typically yields a bonus when achieved on a maximum wager. The list of winning poker hand rankings 82 includes standard poker hand rankings beginning at a pair of jacks or better and includes hands through a royal flush.

The gaming terminal 10 may be configured to offer the player the option of a standard wagering game or a basic wagering game with a replay bonus game. The distinction between the standard wagering game and the basic wagering game is that, with the basic wagering game, a replay bonus game may be initiated once the basic wagering game is completed. Alternatively, when a player selects to play the standard wagering game a replay bonus game will never be initiated.

To begin one of the wagering games, a player wagers one or more credits on the gaming terminal 10. As illustrated in the pay table 58, a maximum wager for a standard wagering game is five credits, though the maximum wager may be any number of credits. Thus, if a player bets five credits or less, for example, the terminal will initiate a standard wagering game for the player. However, if a player chooses to play the basic wagering game with the replay bonus game, the player may, for example, wager twice the maximum wager for the standard wagering game (e.g., 10 credits). Once a player has selected to play the basic wagering game with the replay bonus game, a replay bonus notification 84 is displayed to the player.

Those skilled in the art will understand that a number of events may initiate the replay bonus game, including but not limited to, placing the maximum bet or placing three times the maximum bet. Alternatively, the replay bonus game may be initiated after a certain number of plays on the gaming terminal by a given player. Additionally, the replay bonus game may be initiated by achieving a predetermined hand in the previous round or be randomly initiated by the CPU 30.

Figure 5:
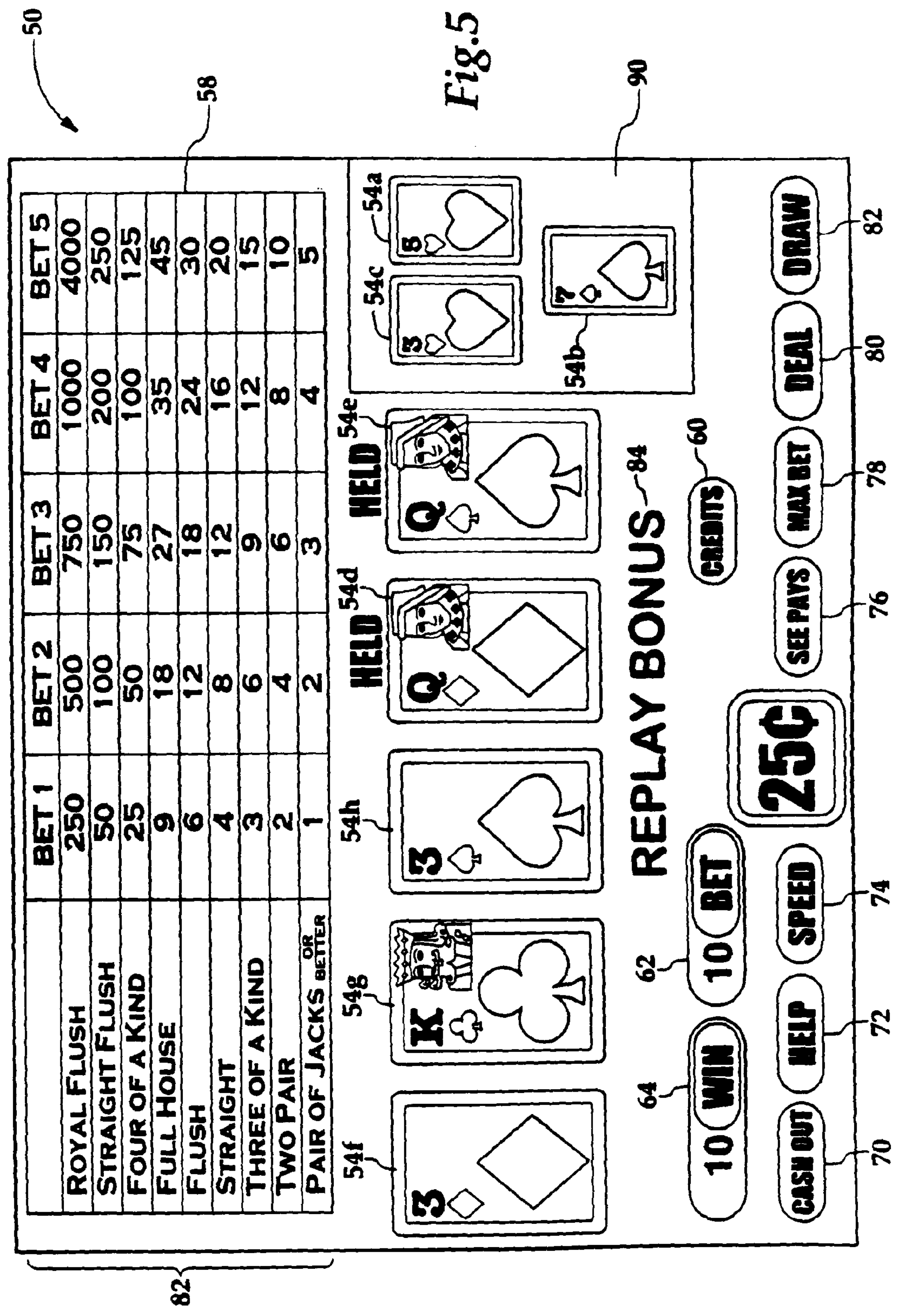
FIG. 5 is an image of a main poker game screen including a discard area that is displayed on the gaming terminal of FIG. 1, according to one embodiment of the present invention.
Figure 6:
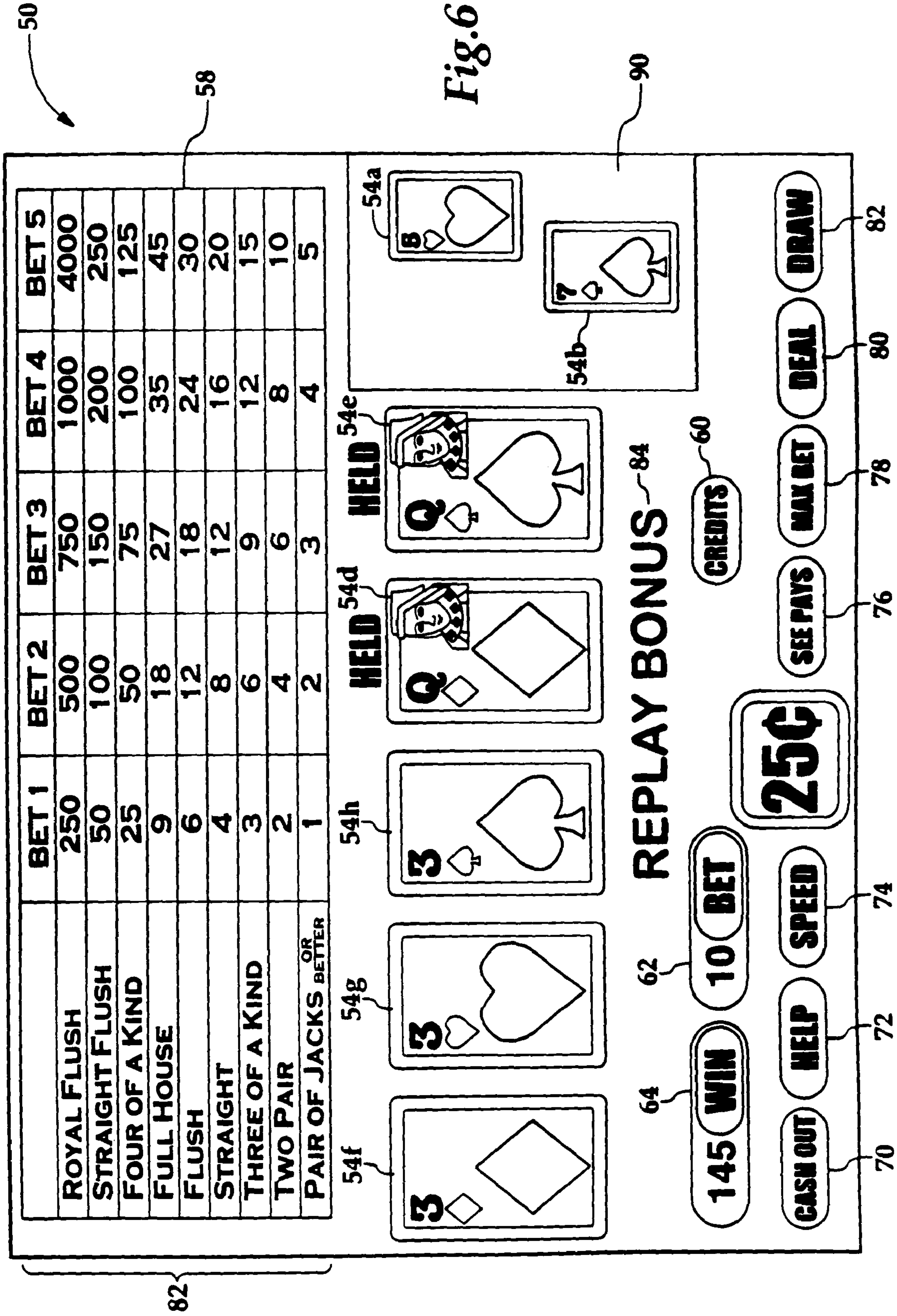
FIG. 6 is an image of a main poker game screen including a discard area that is displayed on the gaming terminal of FIG. 1, according to one embodiment of the present invention.

According to one embodiment, the basic wagering game is five-card draw poker. In a five-card draw poker game, five cards 54*a-e* are displayed face-up to a player to form a first user-playable hand. The player is able to select none, one, or a plurality of the cards 54*a-e* in the user-playable hand to discard. However, the player may not select to discard any winning cards (e.g., the player cannot discard either card 54*d* or card 54*e* because they form a pair of queens, which form a hand specified in the pay table 58). In this embodiment, if the first user-playable hand were to form a five-card straight or flush, full house, etc., the player would be awarded a payout (as explained in more detail with respect to. FIGS. 5-6) and the gaming session would end. According to another embodiment, the player may select any of the cards 54*a-e* to discard. Once a card has been selected to be discarded, any selected card is then replaced to form a second user-playable hand.

Figure 4:
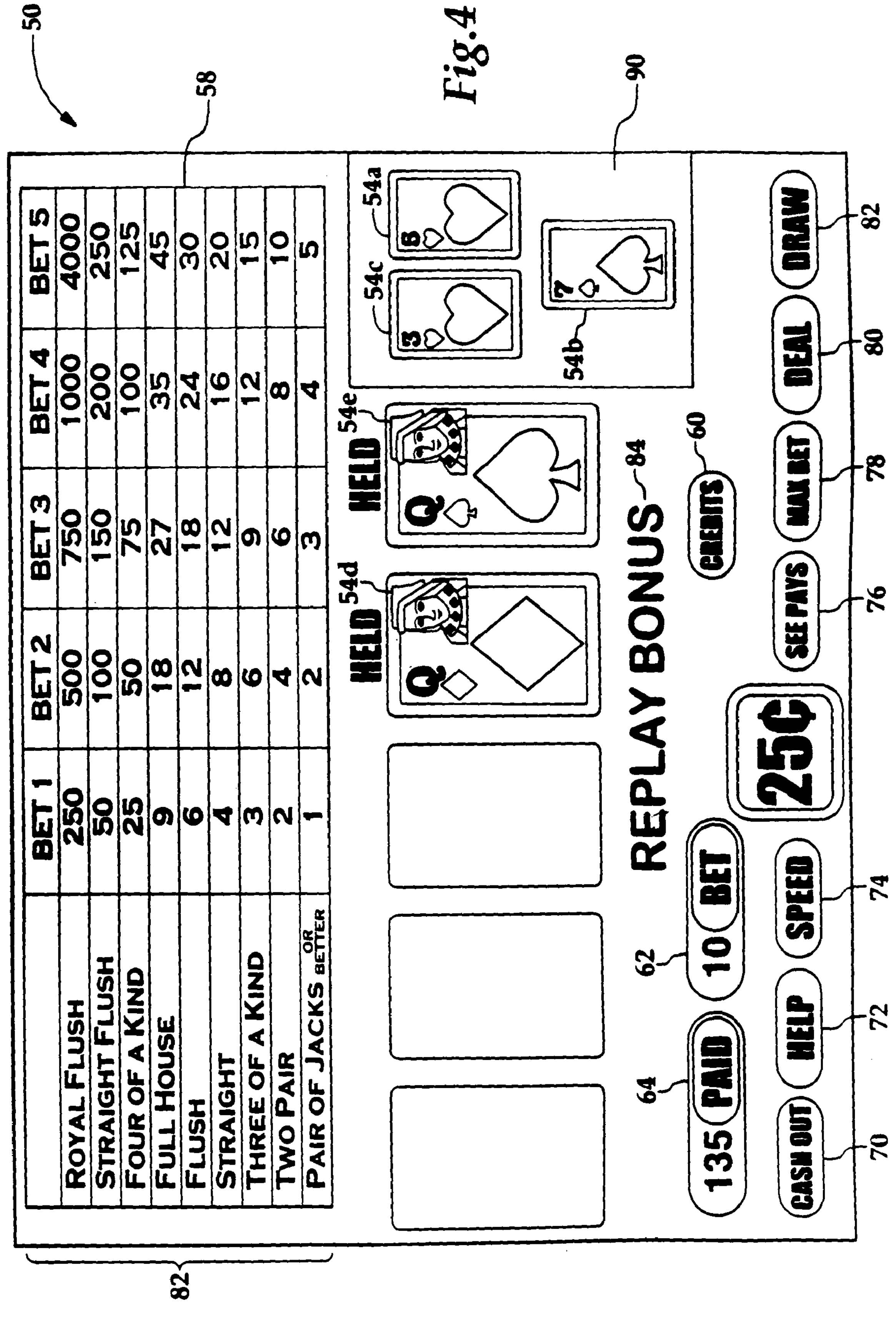
FIG. 4 is an image of a main poker game screen including a discard area that is displayed on the gaming terminal of FIG. 1, according to one embodiment of the present invention.

In FIG. 4, a player has selected three cards 54*a*, 54*b*, 54*c* to discard. These cards 54*a*, 54*b*, 54*c* are then displayed in a discard area 90. Once a card has been sent to the discard area, it is unavailable to the player until the replay bonus game. As illustrated in FIG. 5, the three discarded cards 54*a*, 54*b*, 54*c* are replaced with three additional cards 54*f*, 54*g*, 54*h*—randomly selected from the remaining deck—to form a second user-playable hand.

At the end of the basic wagering game, the highest-ranked poker hand is determined from the second user-playable hand and a player is awarded a primary payoff as displayed in the pay table 58 if the ranking of the hand meets the predetermined criteria displayed in the pay table 58. If a player has chosen to play both the basic wagering game and the replay bonus game, a second poker hand—the best-possible hand—is formed from the second user-playable hand and the discarded cards.

The best-possible hand may be the second user-playable hand as is, and thus, no cards would be replaced. Alternatively, the best-possible hand may be formed by replacing one or more of the five cards in the second user-playable hand with one or more of the cards located in the discard area 90 to form the highest ranked five-card poker hand. As illustrated in FIG. 6, a best-possible hand is formed by replacing one card 54*g* (FIG. 5) from the second user-playable hand with one card 54*c* from the discard area 90.

The primary award displayed in the pay table 58 may be increased when an award is earned by the best-possible hand in the replay bonus game. Similarly, a multiplier may be used to increase the primary award earned by the best-possible hand. A multiplier may be, for example, an integer value that is multiplied by the pay table's 58 primary award value to create an increased award value. For example, if the primary award value in the pay table 58 for a four of a kind is 125 credits and the multiplier is a 3× multiplier, a four of a kind in the best-possible hand would earn a player an award of 375 credits.

The calculation of an award for the illustrated basic wagering game and the replay bonus game (FIGS. 5-6) will be explained, according to one embodiment of the present invention. As illustrated in FIG. 5, upon the completion of the basic wagering game the highest ranked hand the player has formed in the second user-playable hand is two pair. According to the pay table 58, two pair on a five-credit bet earns a player a primary award of 10 credits. Thus, the player is awarded 10 credits for the basic wagering game. As illustrated in FIG. 6, upon completion of the replay bonus game the highest ranked best-possible hand is a full house. According to pay table 58, a full house on a five-credit bet earns a player a primary award of 45 credits. According to some embodiments, the primary award may be increased when the hand is achieved in the best-possible hand. For example, according to the illustrated embodiment in FIG. 6, the primary award of 45 credits is increased by a 3× multiplier. Thus, as illustrated, the player has earned a 10 credit primary award for the second user-playable hand's two pair and an additional 135 credit bonus award (45 credits×3=135 credits) for the best-possible hand's full house—for a total award of 145 credits to the player.

As discussed above, a player may not discard a card from the first user-playable hand when that card is required to form one of the hands for which an award is granted according to the pay table 58. Thus, if for example, the pay table 58 is a "Jacks or Better" pay table as illustrated in FIGS. 3-6, a player may not discard, for example, a queen when a pair of queens has been displayed. Alternatively, if a pair of threes are displayed, a player may choose to discard one or both of the threes because a pair of threes is not one of the hands for which an award would be granted.

Additionally, because a player may not discard a card from the first user-playable hand when that card is required to form one of the hands for which an award is granted, when a five-card hand is displayed for which there is a specified award (e.g., a straight, flush, full-house, etc.). Therefore, if the first user-playable hand forms a straight, a player is unable to discard any of the cards, an award is provided to the player, and the basic wagering game ends without the initiation of a replay bonus game. In this situation, the award provided to the player varies according to the different embodiments of the invention. According to one embodiment of the present invention, a player receives an award twice that specified in the pay table 58 (in embodiments where the player must wager double to play the replay bonus game). According to another embodiment, a player receives the award specified in the pay table 58 and the player's extra wager of credits carry-over to the next wagering game. According to yet another embodiment, a player receives the award specified in the pay table 58 and the player's extra wager is refunded. According to another embodiment, a player receives only the award specified in the pay table 58.

Figure 7:
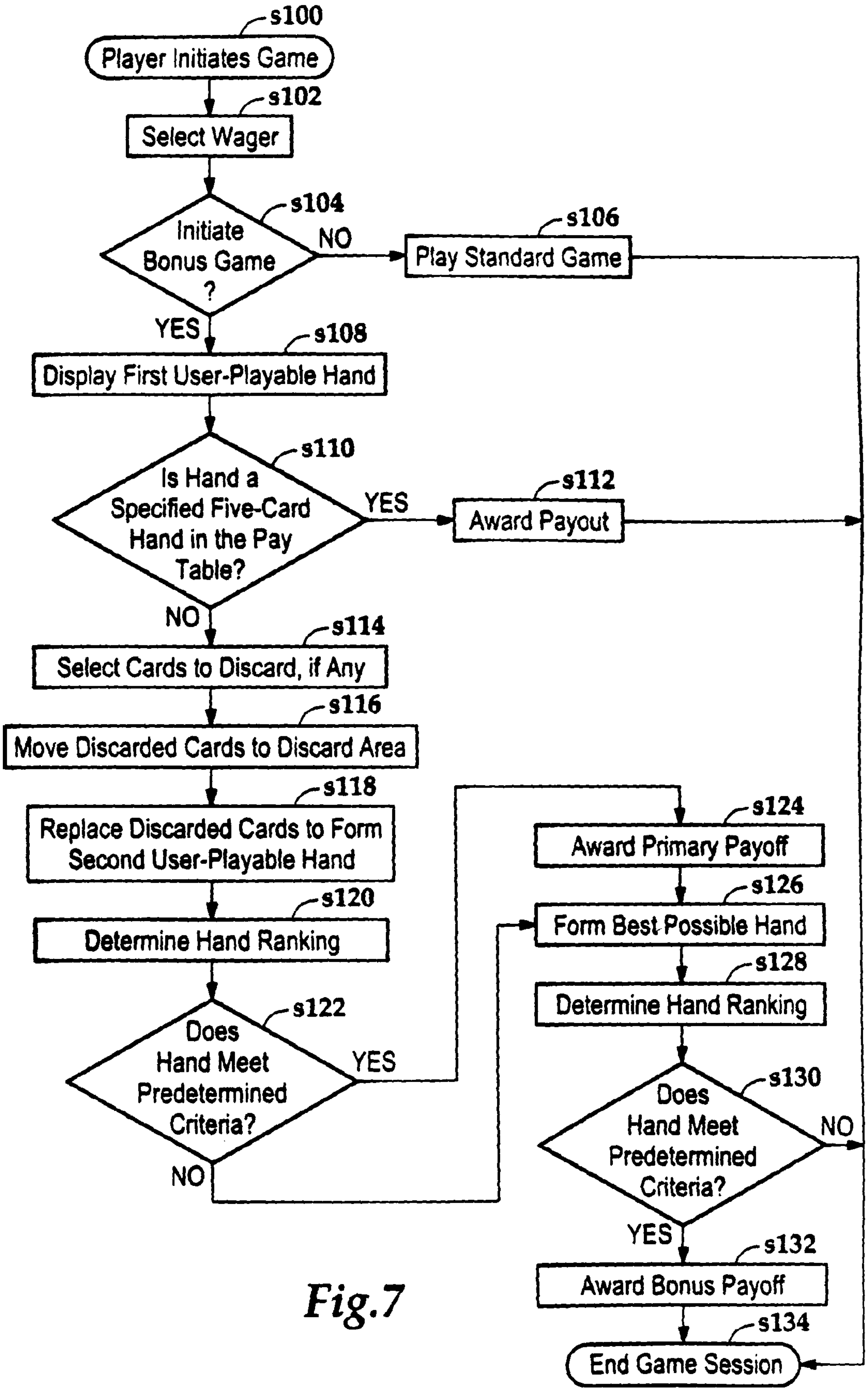
FIG. 7 is a flow diagram detailing a method of operation for a wagering game, according to one embodiment of the present invention.

Turning now to FIG. 7, the operation detailing the method of playing the game according to one embodiment of the invention will be described. In step s100, a player at the gaming terminal 10 begins a gaming session by any conventional method (e.g., inserting coins or using credits). The player then selects an amount to wager on the upcoming user-playable hand at step s102. At decision box s104, a determination is made as to whether to initiate a replay bonus game. As discussed above, a replay bonus game may be initiated for a number of reasons, including but not limited to, wagering a multiple of the maximum wager, wagering the maximum amount, after a plurality of games have been played on the gaming terminal 10, etc. If the determination is made not to initiate the replay bonus game, a standard game is initiated at step s106. The operation of playing a standard game is well known within the art. After the standard game has been completed, the gaming session ends at step s134.

If the determination is made to initiate the replay bonus game at decision box s104, the gaming terminal 10 will display a first user-playable hand at step s108 on the main display 26. A determination is then made at step s110 whether the first user-playable hand creates one of the five-card hands for which a payout is awarded (e.g., straight, flush, full-house, etc.). If the first user-playable hand does form a five-card hand with a payout value, then a payout is awarded at step s112 and the player is prompted to initiate a new game at step s134.

If the determination is made at decision box s 10 that a specified five-card hand has not been formed, then the player is allowed to select none, one, or more of the cards to discard at step s114. According to one embodiment of the present invention, the player is not allowed to select any card which forms a hand specified in the pay table 58 (e.g., for a jacks or better pay table, a player would not be able to discard a queen if a pair of queens was a part of the first user-playable hand). According to another embodiment of the present invention, the player may select up to four cards to discard regardless of what cards are contained in the first user-playable hand. According to another embodiment of the present invention, the player may select three or less cards to discard.

Once the player has selected which (if any) cards to discard at step s114, the discarded cards are moved to the discard area 90 at step s116. The discarded cards are then replaced to form a second user-playable hand at step s118. A hand ranking is then established for the second user-playable hand at step s120. At decision box s122, a determination is made as to whether the hand meets the predetermined criteria contained in the pay table 58. If the hand does meet the predetermined criteria, a primary payoff is awarded at step s124. Once a primary payoff is awarded at step s124, the method proceeds to step s126 where a best-possible hand is formed.

If at decision box s122 the determination is made that the hand does not meet the predetermined criteria contained in the pay table 58, then a best possible hand is formed at step s126. Once the best-possible hand has been formed, a hand ranking is established for the best-possible hand at step s128. At decision box s130, a determination is made as to whether the hand meets the predetermined criteria contained in the pay table 58. If the hand does not meet the predetermined criteria, then the player is prompted to initiate a new game at step s134. If, however, the hand does meet the predetermined criteria, then a bonus payoff is awarded at step s132. Once the bonus payoff has been awarded, the player is prompted to initiate a new game at step s134.

It should be understood that the above invention is not limited to a video poker system and may be instituted on a standard casino table or another means sufficient to conduct the above described wagering game.

While the present invention has been described with reference to one or more particular embodiments, those skilled in the art will recognize that many changes may be made thereto without departing from the spirit and scope of the present invention. Each of these embodiments and obvious variations thereof is contemplated as falling within the scope of the claimed invention, which is set forth in the following claims.

What is claimed is:

1. A method of conducting a wagering game, comprising: receiving a wager from a player to play the game via a wager input device; providing a plurality of symbol-bearing objects to form a first user-playable hand via a processor; providing the ability to discard, via player selection, one or more of the provided symbol-bearing objects from the first user-playable hand; collecting the discarded symbol-bearing objects exclusively for use in a best-possible hand for the player; replacing each of the discarded symbol-bearing objects with a replacement symbol-bearing object to form a second user-playable hand; awarding the player a payoff based on a ranking of the second user-playable hand in response to the second user-playable hand meeting a predetermined criterion; forming the best-possible hand from a combination of the plurality of the symbol-bearing objects of the second user-playable hand and the collected, discarded symbol-bearing objects; and awarding a bonus payoff based on a ranking of the best-possible hand in response to the best-possible hand meeting a predetermined criterion.

2. The method of claim 1, wherein the payoff award is based on an award value contained within a pay table.

3. The method of claim 2, wherein the bonus payoff is a multiple of the award value contained within the pay table.

4. The method of claim 3, wherein the bonus payoff is three times the award value contained within the pay table.

5. The method of claim 1, wherein a maximum of four symbol-bearing objects are able to be discarded from the first user-playable hand.

6. The method of claim 1, wherein the ability to discard one or more of the symbol-bearing objects from the first user-playable hand is limited to the ability to discard one or more of the symbol-bearing objects that do not meet a predetermined criterion within the first user-playable hand.

7. A method of conducting a wagering game, comprising: receiving a wager from a player to play the game via a wager input device; displaying a plurality of playing cards to form a first user-playable hand via a processor; providing the ability to discard, via player selection, one or more of the displayed playing cards from the first user-playable hand; collecting the discarded playing cards in a discard area exclusively for use in a best-possible hand for the player; replacing each of the discarded playing cards with a replacement playing card to form a second user-playable hand; awarding the player a payoff based on a ranking of the second user-playable hand in response to the second user-playable hand meeting a predetermined criterion; forming the best-possible hand from a combination of the plurality of the playing cards of the second user-playable hand and the playing cards collected in the discard area; and awarding a bonus payoff based on a ranking of the best-possible hand in response to the best- possible hand meeting a predetermined criterion.

8. The method of claim 7, wherein the ability to discard one or more cards from the first user-playable hand is limited to the ability to discard one or more cards which do not meet a predetermined criterion within the first user-playable hand.

9. The method of claim 8, wherein the predetermined criterion are defined in a pay table.

10. The method of claim 7, wherein the first user-playable hand, the second user-playable hand, and the best-possible hand each include five playing cards.

11. The method of claim 10, wherein the predetermined criterion are five-card poker hands.

12. The method of claim 7, wherein the playing cards are displayed and replaced from a standard 52-card set of playing cards.

13. A method of conducting an electronic poker game, comprising: receiving a wager from a player to play the game via a wager input device; displaying, on a display, five playing cards to form a first user-playable hand via a processor; allowing a single discard round based on the wager the single discard round including player selection of one or more of the five displayed playing cards from the first user-playable hand; collecting the discarded playing cards in a discard area on the display exclusively for use in a best-possible hand for the player; replacing each of the discarded playing cards with a replacement playing card to form a second user-playable hand of five cards; forming the best possible hand from a combination of the second user playable hand and the discarded playing cards based solely on the single discard round; and awarding a bonus payoff based on a ranking of the best-possible hand in response to the best-possible hand meeting a predetermined criterion solely after the single discard round.

14. The method of claim 13, wherein the ability to discard one or more of the five playing cards from the first user-playable hand is limited to the ability to discard one or more of the playing cards that do not meet a predetermined criterion within the first user-playable hand.

15. The method of claim 13, wherein the playing cards are displayed and replaced from a standard 52-card set of playing cards.

* * * * *